(12) United States Patent
Mukogawa et al.

(10) Patent No.: US 6,402,339 B1
(45) Date of Patent: *Jun. 11, 2002

(54) PASSENGER-CABIN LIGHTING DEVICE

(75) Inventors: Takao Mukogawa, Bisai; Osamu Yamanaka, Nishikasugai-gun; Tadanobu Iwasa, Ichinomiya; Hiroshi Sugihara, Ogaki, all of (JP)

(73) Assignee: Toyoda Gosei Co., Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,247

(22) Filed: Nov. 10, 1999

(51) Int. Cl.⁷ .............................................. F21V 33/00
(52) U.S. Cl. ........................ 362/184; 362/202; 362/208; 362/800
(58) Field of Search ................................ 362/102, 184, 362/800, 202, 205, 208, 231

(56) References Cited

U.S. PATENT DOCUMENTS

| | | | | | |
|---|---|---|---|---|---|
| 5,631,623 A | * | 5/1997 | Campman | .................... | 340/321 |
| 5,633,629 A | * | 5/1997 | Hochstein | .................... | 340/907 |
| 5,813,753 A | * | 9/1998 | Yriens et al. | ................ | 362/293 |

* cited by examiner

Primary Examiner—Sandra O'Shea
Assistant Examiner—John Anthony Ward
(74) Attorney, Agent, or Firm—Pillsbury Winthrop LLP

(57) ABSTRACT

A passenger-cabin lighting device comprises as follows. A transparent member is made of synthetic resin not containing scattering material, and has a light emitting surface and a light reflecting surface. A semitransparent member is made of semitransparent synthetic resin containing the scattering material. The semitransparent member is bonded to an inside of the transparent member to constitute a light emitting body. A plurality of light emitting diodes are diposed on one end face of the light emitting body for projecting light into the transparent member and the semitransparent member. A control circuit controls flickering of the plurality of light emitting diodes. The thus constructed passenger-cabin lighting device may be used for lighting and illuminating the passenger cabin, and for highlighting the car itself.

18 Claims, 3 Drawing Sheets

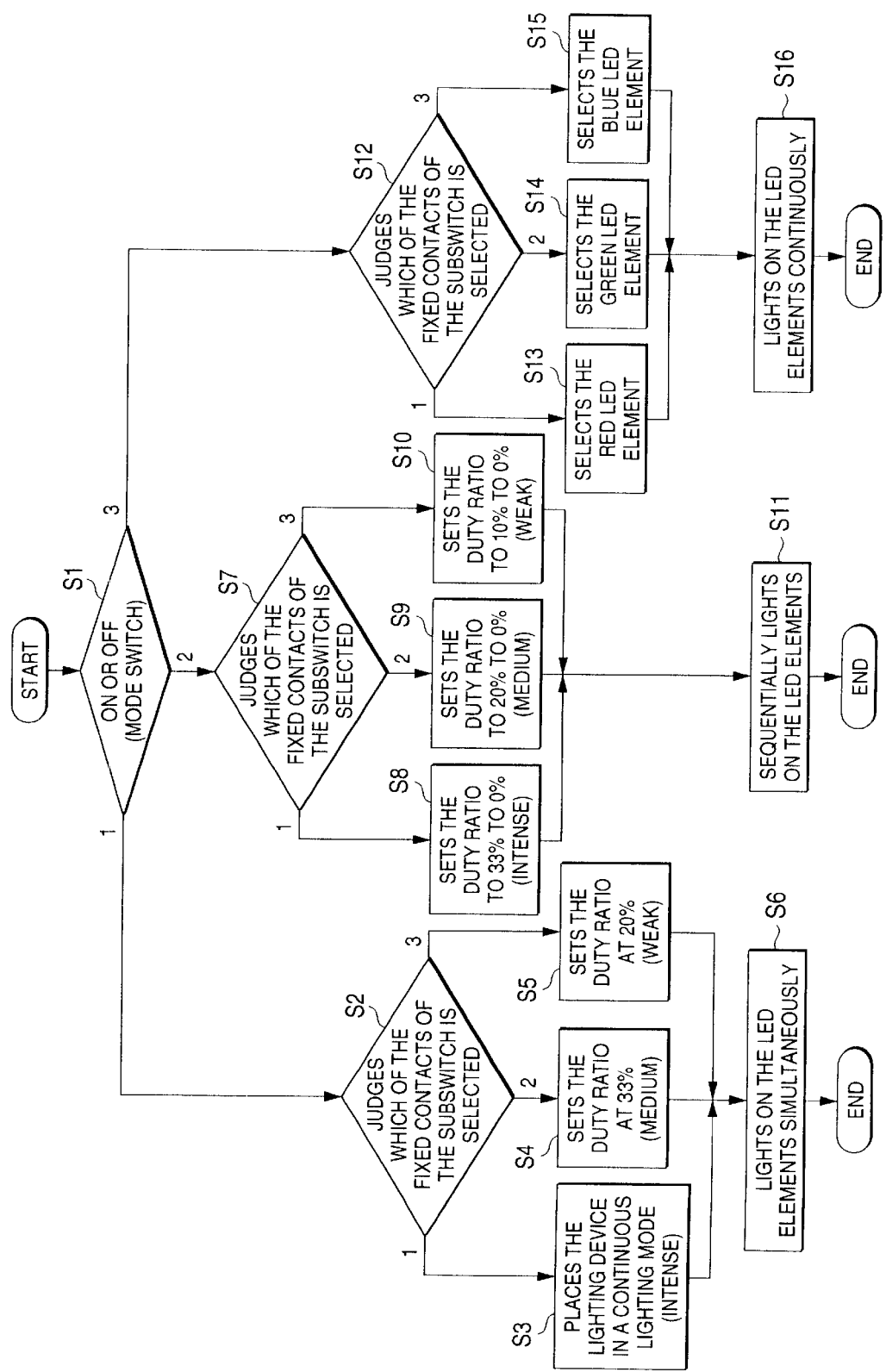

PASSENGER-CABIN LIGHTING DEVICE

BACKGROUND OF THE INVENTION

1. Field of the Invention

The present invention relates to a passenger-cabin lighting device with a light emitting diode (referred with "LED" hereinafter), which is operable as a spot lighting device or an illuminator.

2. Description of the Related Art

There is known a passenger-cabin lighting device of the type which receives electric power from a cigarette socket of a cigarette lighter of the vehicle. This type of the passenger-cabin lighting device uses a predetermined bulb as a light source, and is used as a lighting device or an illuminator.

When the bulb is lighted for the lighting or illuminating purpose, a load to a car battery increases. The increased load will adversely affect the starting operation of a starter of the vehicle or car. The passenger-cabin lighting device may be used as an illuminator, indeed. However, its function of color expression is simple to such a degree that it is only enough to produce seasonal atmosphere created by cabin temperature in summer or winter.

SUMMARY OF THE INVENTION

Accordingly, an object of the present invention Includes provision of a passenger-cabin lighting device which enables less power consumption, sophisticated and dramatic color expression, and hence increases the range of its use.

To achieve the above object, there is provided a passenger-cabin lighting device comprising: a light emitting body having a transparent member including a layer made of synthetic resin not containing scattering material, one of the surfaces of the transparent member as viewed in the thickness direction serving as a light reflecting surface and the other surface being a light emitting surface, and a semitransparent member including semitransparent synthetic resin containing scattering material, the semitransparent member being bonded to the inside of the transparent member a plurality of light emitting diodes for projecting light into the transparent member and the semitransparent member, the light emitting diodes being provided in one of the end face of at least the light emitting body; and a control circuit of an electronic control unit and the like for controlling flickering of the plurality of light emitting diodes.

The light emitting diodes preferably emit light of at least two colors.

The light emitting diodes preferably emit light of three primary colors.

Preferably, the control circuit for controlling the flickering of the plurality of light emitting diodes selectively performs a control for spot lighting or an illumination control.

Preferably, the control circuit for controlling the flickering of the light emitting diodes varies colors one to another in a time sequential manner.

Features and advantages of the invention will be evident from the following detailed description of the preferred embodiments described in conjunction with the attached drawings.

BRIEF DESCRIPTION OF THE DRAWINGS in the accompanying drawings

FIG. 5 is a flow chart showing a flow of the control for the passenger-cabin lighting device of the first embodiment.

DETAILED DESCRIPTION OF THE PREFERRED EMBODIMENTS

The preferred embodiments of the present invention will be described with reference to the accompanying drawings.

Figure 1:
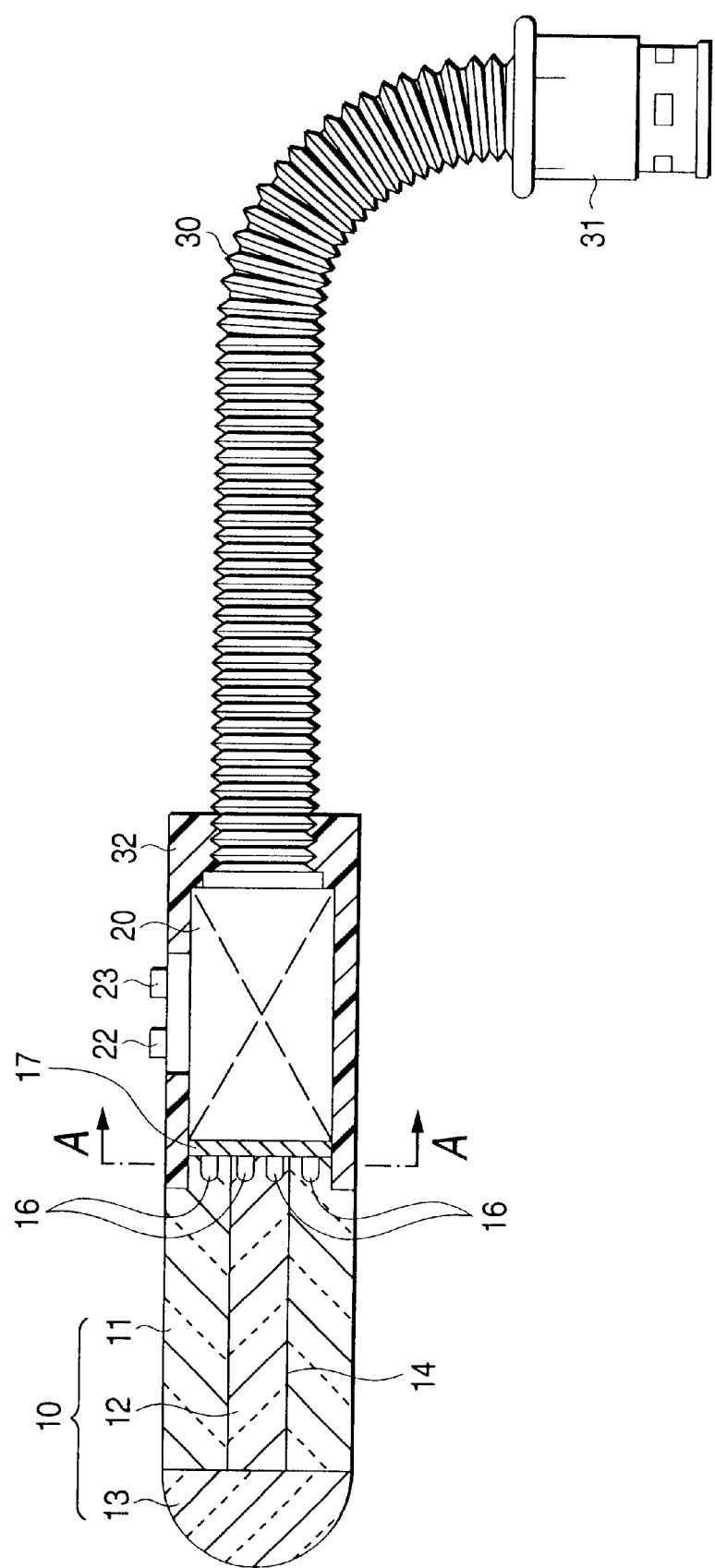
FIG. 1 is a view showing an overall passenger-cabin lighting device which is an embodiment of the present invention, a key portion of the lighting device being sectionally shown.
Figure 2:
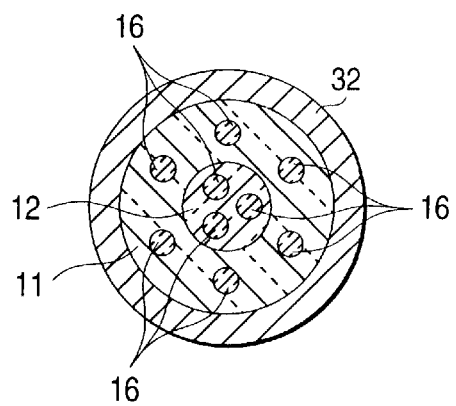
FIG. 2 is a cross sectional view taken along line A—A in FIG. 2.
Figure 3:
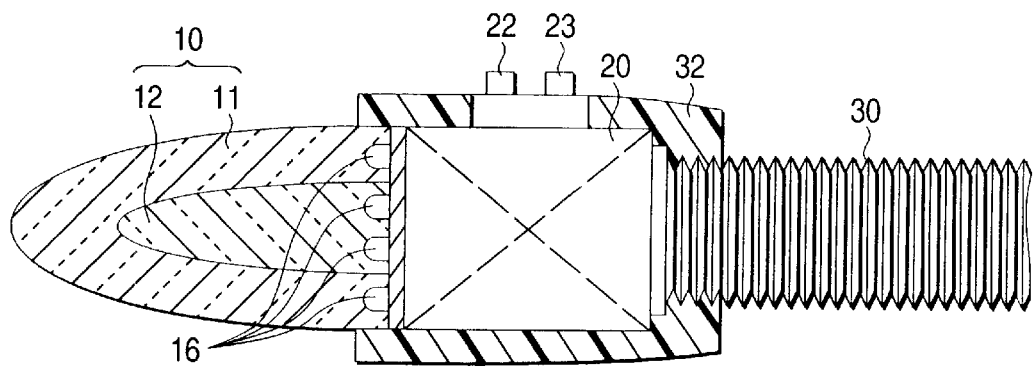
FIG. 3 is a longitudinal sectional view showing a key portion of a passenger-cabin lighting device which Is a second embodiment of the invention.
Figure 4:
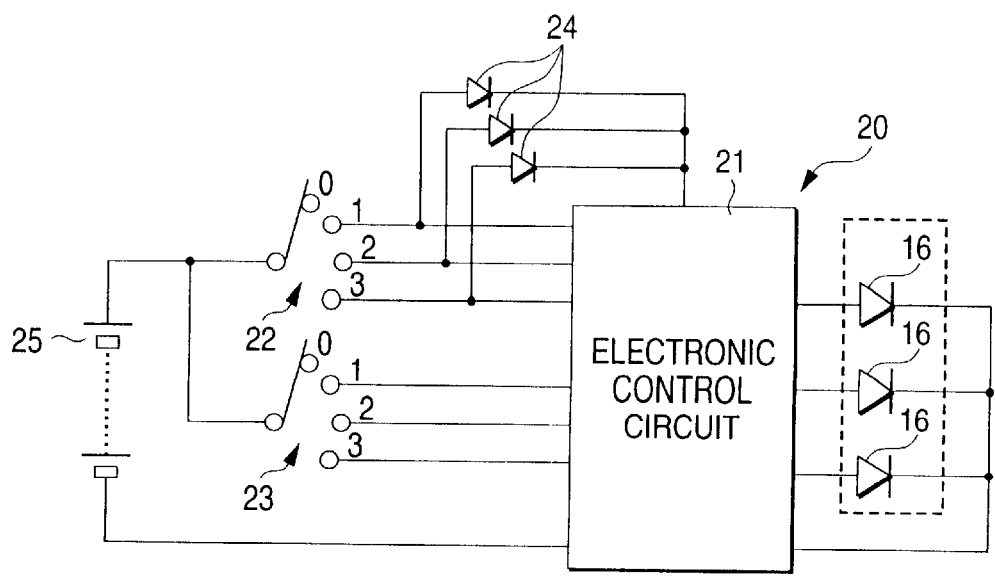
FIG. 4 is a circuit diagram showing a control circuit for controlling the passenger-cabin lighting device of the first embodiment.

FIG. 1 is a view showing an overall passenger-cabin lighting device which is an embodiment of the present invention, a key portion of the lighting device being sectionally shown. FIG. 2 is a cross sectional view taken along line A—A in FIG. 2. FIG. 3 is a longitudinal sectional view showing a key portion of a passenger-cabin lighting device which is a second embodiment of the invention. FIG. 4 is a circuit diagram showing a control circuit for controlling the passenger-cabin lighting device of the first embodiment. FIG. 5 is a flowchart showing a flow of the control for the passenger-cabin lighting device of the first embodiment.

Reference is made to FIGS. 1 and 2. A cylindrical transparent member 11 is made of a transparent material not containing light scattering material. The cylindrical transparent member 11 may be made of thermoplastic resin such as acrylic resin, polystyrene, AS resin, polycarbonate, acryl-styrene monomer copolymer resin, or the likes. This transparent member 11 may be also made of thermosetting resin such as epoxy resin, urethane resin or the like. The outer peripheral surface of transparent member 11 serves as a light emitting surface, and the inner surface thereof nerves as a light reflecting surface for reflecting the light emitted from a semitransparent member 12 hereinafter described.

The column-like semitransparent member 12 may be formed with a semitransparent resin layer containing scattering material of thermoplastic resin, such as acrylic resin, polystyrene, AS resin, polycarbonate, acryl-styrene monomer copolymer resin, or the like. The column-like semitransparent member 12 is bonded onto the inner surface of the cylindrical transparent member 11. The semitransparent thermoplastics containing scattering material may also be replaced with thermosetting resin, such as epoxy resin, urethane resin, or the like.

A convex transparent member 13 is made of transparent material not containing scattering material, which is thermoplastics as of the cylindrical transparent member 11. The convex transparent member 13 is bonded, by adhesive, to one end (first end) of the combination of the cylindrical transparent member 11 and the column-like semitransparent member 12.

The passenger-cabin lighting device may also be manufactured in the following manner. A semitransparent member 12 made of resin containing scattering material is poured into a cylindrical transparent member 11, which is made of transparent material not containing scattering material and is closed at one end with a convex transparent member 13, whereby the semitransparent member 12 is bonded to the transparent member 11.

The cylindrical transparent member 11, semitransparent member 12 and transparent member 13 cooperate to form a light emitting body 10.

In the structure in which the transparent members 11 and 13 are made of thermoplastics and the semitransparent member 12 made of thermoplastics is used as a filling member, a diffusion layer 14 is formed in the interface between those joined resin members. Even if any of the transparent members 11 and 13 and the semitransparent member 12 is first formed, the diffusion layer 14 is inevitably formed when those resin members are united into a single body. The semitransparent member 12 is used in order to form the diffusion layer 14 in the interface between the resin members when those are joined together, especially, on the outer peripheral surface of the the semitransparent member 12 for diffusing and emitting light. Therefore, the amount of scattering material used may be small. in this embodiment, the outer peripheral surface of the column-like semitransparent member 12 serves as a light emitting surface as well as a light diffusion surface. The diffusion layer 14 is formed by mixing powder scattering material such as $TiO_2$ into the resin, or by mixing non-compatible resin into the semitransparent member 12, or by other manners.

A plurality of LEDs 16 are provided on the other end (second end) of the combination of the transparent member 11 and the semitransparent member 12. Each of LEDs comprises LED lumps 16 of red, green and blue. An LED device is constituted by a printed circuit board 17, and the LED lamps 16 of red, green and blue, which are mounted on the printed circuit board 17. The LEDs 16 including red, green and blue LED lamps are put in concavities formed in the second end of the combination of the transparent member 11 and the semitransparent member 12. The former is bonded to the surface of the concavity by adhesive so as to minimize light reflection by the end face of the combined members 11 and 12.

While the LED device includes paired LED lamps 16 of red, green and blue, those LED lamps may be substituted by LED chips 16 of red, green and blue. In this case, the LED device, which is put on the second end of the column-like semitransparent member 12, contains LED chips 16 of three primary colors, red, green and blue.

The passenger-cabin lighting device of this embodiment may be manufactured by the following method. Paired LED lamps or chips of red, green and blue (those LED lamps and chips will be referred generally to as LED elements frequently), which are mounted on the printed circuit board 17, is prepared. A semitransparent member 12 is formed on the printed circuit board with the paired LED lamps or chips. Then, a transparent member 11 is formed on the resultant structure. This method is advantageous in that it eliminates the bonding work for bonding the LED device, the transparent member 11 and the semitransparent member 12 by adhesive, and that light is more efficiently input to the structure. In the embodiment, it is preferable to increase an amount of light input from the LED device to the diffusion layer 14 as the bonding surface between the transparent member 11 and the semitransparent member 12 rather than the column-like semitransparent member 12. A ratio of the amount of light from the LED device to the transparent member 11 to the amount of light from the same to the semitransparent member 12 is not of significance in the embodiment under discussion.

To form an electronic control unit 20, an electronic control circuit 21 for controlling a light emission from the LED device with duty ratio, which is Counted on the printed circuit board 17, a mode switch 22 and a subswitch 23 are assembled into one unit of a synthetic resin housing 32 by molding process. The mode switch 22 and the subswitch 23, each consisting of a four-position switch, are arrayed side by side. The subswitch 23 is sued for changing colors and varying an intensity of light. The electronic control unit 20 receives electric power from a cigarette lighter socket 31, which is coupled to a car battery 25. The cigarette lighter socket 31 and the housing 32 are mechanically interconnected by means of a flexible tube 30 which contains a lead wire therein. The lead wire electrically connects the electronic control unit to the car battery 25. For the formation of the electronic control unit 20, the electronic control circuit 21 for controlling a light emission in terms of duty ratio, the mode switch 22 as a four-position switch, and the subswitch 23 as a four-position switch for changing colors and varying an intensity of light are arranged and set at predetermined positions, and in this state, and are fixed by injection molding the housing 32.

As shown in FIG. 4, the electronic control circuit 21 for controlling the duty ratio of the plurality of LEDs 16, which forms the electronic control unit 20, contains a microcomputer as a major component. The mode switch 22 (four-position switch) includes a movable contact and fixed contacts 0 to 3. The movable contact of the mode switch 22 is connected to one end (first end) of the car battery 25. The fixed contacts of the mode switch 22 are connected to the first ends of the diodes 24, respectively. The second ends or the diodes 24 are connected together to the electronic control circuit 21. The subswitch 23 (four-position switch) also includes a movable contact and fixed contacts 0 to 3. The movable contact of the subswitch 23 is also connected to the first end of the car battery 25. The fixed contacts 0 to 3 of the subswitch 23 are directly connected to the electronic control circuit 21, respectively. The electronic control circuit 21 id connected at the output terminals to the LEDs 16 of the LED device. The passenger-cabin lighting device of the invention is operable in different modes, mode 0 to mode 3. To select a desired operation mode of the lighting device, the mode switch 22 is operated. The fixed contacts 0 to 3 of the mode switch 22 correspond to those operation modes 0 to 4. To select the mode 0, the mode switch 22 is operated to bring the movable contact into contact with the fixed contact 0. The details of the operation of the mode switch 22 will subsequently be described.

The passenger-cabin lighting device of the first embodiment is designed as a spot lighting device. However, it should be understood that the passenger-cabin lighting device of the invention is applicable to other devices than the spot lighting device.

Turning now to FIG. 3, there is shown another embodiment of a passenger-cabin lighting device according to the present invention. In the figure, like or equivalent portions are designated by like reference numerals FIGS. 1 and 2, for simplification.

A cup-shaped transparent member 11 is made of transparent material not containing scattering material. A semitransparent member 12, which is formed within the transparent member 11, is made of thermoplastic containing scattering material. To form the semitransparent member 12, semitransparent material of thermoplastics is poured into the hollow of the transparent member 11. In the resultant structure, the semitransparent member 12 is bonded to the inner surface of the transparent member 11.

The structure of the transparent member 11 and the semitransparent member 12 is capable of substantially uniformly radiating light.

The operations of the passenger-cabin lighting devices of the first and second embodiments of the present invention will be described.

When the mode switch 22 is operated and its operation mode is changed from a mode 0 to any of modes 1 to 3. As already stated, the mode 0 is set up when the movable contact of the mode switch 22 is brought into contact with the fixed contact 0. The fixed contact 0 for the mode 0 is connected to nothing. Accordingly, in the mode 0, no electric power is supplied to the electronic control circuit 21. The fixed contacts 1 to 3 for the modes 1 to 3 are connected through the diodes 24 to the electronic control circuit 21. Therefore, when any of the modes 1 to 3 is set up, electric power is supplied to the electronic control circuit 21 to render it active, viz., to start a program stored in the electronic control circuit 21 to run. A step S1 in the program judges which of the modes 1 to 3 is set up by the mode switch 22. If the mode 1 is set up, a step S2 judges which of the fixed contacts of the subswitch 23 for color selection and light intensity varying is selected (viz., to which its movable contact is set). If the fixed contact 1 (=position 1 for strong lighting) of the subswitch 23 is selected, a step S3 places the lighting device in a continuous lighting mode. If the fixed contact 2 (=position 2 for medium lighting) is selected, a step S4 sets the duty ratio at 33%. If the fixed contact 3 (=position 3 for weak lighting) is selected, a step S5 sets the duty ratio at 20%. A step 86 lights on the all LED elements simultaneously. In particular when the medium lighting position 2 and weak lighting position 3 are selected, the time-vision control can be executed taking the duty ratio into consideration not to simultaneously supply electric power to a plurality of LED elements. In particular when the medium lighting position 2 and weak lighting position 3 are selected and the duty ratio is 33% or less, a load to the car battery 25 is below a predetermined level and uniform. This Leads to elongation of the lifetime of the car battery 25; an energy saving mode is set up. In this case, appropriate increase of the frequency of the flickering of the lighting device lessens the flickering to be negligible for the human eyes. For the brightness of the lighting device in this mode, the peak current feeding is used for the intense lighting (continuous lighting).

The simultaneous lighting mode in which the LED elements 16 of the LED device are simultaneously lighted on, is suitable for a spot illumination carried out by emitting light from the convex transparent member 13. The spot lighting may be used for writing of memos, reading and searching.

When the step 1 judges that the mode 2 (fixed contact 2) of the mode switch 22 is selected, a step S7 judges which of the fixed contacts of the subswitch 23 is selected. If the intense lighting position 1 (=fixed contact 1) is selected, a step St. sets the duty ratio to 33% to 0%. If the medium lighting position 2 (=fixed contact 2) is selected, a step S9 sets the duty ratio to 20% to 0%. If the weak lighting position 3 (=fixed contact 3) is selected, a step S10 sets the duty ratio to 10% to 0%. A step S11 sequentially lights on the LED elements of red, green and blue in this order, for example; it sets up a duty-varying lighting mode.

In the duty-varying lighting code, light colors are sequentially changed In the order of red, green and blue. Accordingly, this mode may be used for cabin illumination. When the passenger-cabin lighting device is operated in the duty-varying lighting mode, attention may be attracted to the car being on display. Further, during running of two cars in the night, if the first car operates the lighting device in this mode, a driver of the second car can easily recognize the first car.

If the step S1 judges that the mode 3 (=fixed contact 3) is selected by the subswitch 23, a step S12 judges which of the fixed contacts 1 to 3 of the subswitch 23 is selected. If the red lighting position 1 (=fixed contact 1) is selected, a step S13 selects the red LED element 16 of the LED device. If the green lighting position 2 (=fixed contact 2) is selected, a step S14 selects a green LED element 16 of the LED device. If the blue lighting position 3 (=fixed contact 3) is selected, a step S15 selects a blue LED element 16. And a step S16 lights on those LED elements 16 continuously.

In this state, the passenger cabin of the car may be lighted up with red, green and blue colors.

In the above-mentioned embodiments, the output signal of the LED device is controlled in the form of a change of the duty ratio. Alternatively, the same thing may be realized by changing the pair of LEDs 16 to be lighted. In this case, to use the lighting device for the lighting purpose, the pair of LEDs are switched so as to inhibit the LED device located at the end of the semitransparent member 12 from lighting.

As described above, the passenger-cabin lighting device of each embodiment comprises: a light emitting body 10 having a transparent member 11 including a layer made of synthetic resin not containing scattering material, one of the surfaces of the transparent member as viewed in the thickness direction serving as a light reflecting surface and the other surface being a light emitting surface, and a semitransparent member 12 including semitransparent synthetic resin containing scattering material, the semitransparent member being bonded to the inside of the transparent member 11; a plurality of LEDs 16 for projecting light into the transparent member 11 and the semitransparent member 12, the LEDs 16 being provided in one of the end face of at least the light emitting body 10; and a control circuit of an electronic control unit 20 and the like for controlling flickering of the plurality of LEDs 16.

Thus, the passenger-cabin lighting device enables the driver to light the passenger cabin of a car with a desired color. Further, it may be used for lighting and illuminating the passenger cabin, and for highlighting the car itself. Further, it is noted that the LED device is flickered. This feature results in less power consumption, and sophisticated and dramatic color expression, and hence increases the range of its use. Further, it is noted that light emitted from the LED device can be scattered by the diffusion layer at high efficiency without forming a reflecting entrance, e.g., a white coating, on the light introducing portion of the transparent member 11. Additionally, the passenger-cabin lighting device provides a less costly construction when comparing with the lighting device of the type in which the inner surface of the transparent member 11 is processed for prism.

Where the LED device capable of emitting light of two or more number of colors is used, a desired color may be produced Where the LED device is capable of emitting light of three primary colors, every color can be produced, and the passenger cabin of the car being on view may be lighted with white light.

The control circuit of the electronic control unit 20 for controlling the flickering of the LED device selectively performs a control for s pot lighting or an illumination control. Therefore, the user can selectively use either of those controls according to his desire.

The control circuit of the electronic control unit 20 for controlling the flickering operation of the LED device varies colors one to another in a time sequential manner. This function enables the user to produce in-cabin illumination of the car being on display as desired.

In the passenger-cabin lighting device of each embodiment, satisfying the requirement of securing a bonding surface between the transparent member 11 and the semitransparent member 12 suffices for a light emitting body 10, which has a transparent member 11 including a layer made of synthetic resin not containing scattering material, one of the surfaces of tie transparent member as viewed in the thickness direction serving as a light reflecting surface and the other surface being a light emitting surface, and a semitransparent member 12 including semitransparent synthetic resin containing scattering material, the semitransparent member being bonded to the inside of the transparent member 11. Therefore, the light emitting body 10 may be shaped as desired.

The mode switch 22 and the subswitch 23 are used in the above-mentioned embodiments. If required, the mode switch 22 may be substituted by a sensor. in this case, the sensor may be a sensor for sensing a pitch or an intensity of sound within the cabin, an antitheft sensor, or a temperature sensor. Use of the sensor allows information gathered from the sensor to be caught outside the car.

The shape of the light emitting body is not limited to the shapes of the aforementioned embodiments. For example, the light emitting body may be shaped in a plate-like body or the like.

As seen from the foregoing description, the present invention provides a passenger-cabin lighting device, comprising a light emitting body having a transparent member including a layer made of synthetic resin not containing scattering material, one of the surfaces of the transparent member as viewed in the thickness direction serving as a light reflecting surface and the other surface being a light emitting surface, and a semitransparent member including semitransparent synthetic resin containing scattering material, the semitransparent member being bonded to the inside of the transparent member; a plurality of LEDs for protecting light into the transparent member and the semitransparent member, the LEDs being provided in one of the end face of at least the light emitting body; and a control circuit of an electronic control unit and the like for controlling flickering of the LEDs. The passenger-cabin lighting device thus constructed accrues to the following significant advantages. The passenger cabin of the car may be lighted with a desired color. The lighting device may be used for lighting and Illuminating the passenger cabin, and for highlighting the car itself. Further, the LED device is flickered. This feature enables less power consumption, intricate and dramatic color expression, and hence increases the range of its use. Further, it eliminates the necessity of coating the light introducing portion of the transparent member with white material or processing the same location for prism. This results in reduction of cost to manufacture.

Thus, the passenger-cabin lighting device consumes less electric power, and is capable of producing intricate color expression. If it is combined with various types of sensors, the range of its use is increased.

In the passenger-cabin lighting device, the LED device emits light of at least two colors. Therefore, the lighting device has an advantage of producing color expression as desired in addition to the advantages of the above passenger-cabin lighting device.

In the passenger-cabin lighting device, the light emitting diodes emit light of three primary colors. Therefore, the lighting device has an advantage of producing expression of every kind of color, in addition to the advantages of the above passenger-cabin lighting device.

In the passenger-cabin lighting device, the control circuit for controlling the flickering of the plurality of light emitting diodes selectively performs a control for spot lighting or an illumination control. Therefore, the user can selectively use either of those controls according to his desire in addition to the advantages of the above passenger-cabin lighting device.

In the passenger-cabin lighting device, the control circuit of the electronic control unit for controlling the flickering of the light emitting diodes varies colors one to another in a time sequential manner. This function enables the user to produce in-cabin illumination of the car being on display as desired, in addition to the advantages of the above passenger-cabin lighting device.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A passenger-cabin lighting device, comprising:
   a light emitting body including
      a transparent member including a main body made of thermoplastic resin not containing scattering material, said transparent member having an exterior surface and an interior surface; and
      a semitransparent member including a second main body made of semitransparent thermoplastic resin containing the scattering material, said semitransparent member being bonded to said interior surface, thereby forming a diffusing layer between said interior surface and said semitransparent member;
      a plurality of light emitting diodes arranged to project light into said transparent member and said semitransparent member, said light emitting diodes being disposed on one end face of said light emitting body; and
   a control circuit adapted to control flickering of said plurality of light emitting diodes.

2. A passenger-cabin lighting device according to claim 1, wherein said light emitting diodes emit light of two or more colors.

3. A passenger-cabin lighting device according to claim 2, wherein said light emitting diodes emit red, green, and blue light.

4. A passenger-cabin lighting device according to claim 1, wherein said control circuit is adapted to selectively perform a control for one of a spot lighting and an illumination control.

5. A passenger-cabin lighting device according to claim 1, wherein said control circuit is adapted to vary colors one to another in a time sequential manner.

6. A passenger-cabin lighting device according to claim 1, wherein said transparent member is cylindrically shaped, forming a bore.

7. A passenger-cabin lighting device according to claim 6, wherein said semitransparent member is cylindrically shaped, and is disposed within said bore.

8. A passenger-cabin lighting device according to claim 1, wherein said light emitting diodes are disposed on an end face of said transparent member and an end face of said semitransparent member, both of said end faces being substantially in one plane.

9. A passenger-cabin lighting device according to claim 1, further comprising a second transparent member including a synthetic resin not containing scattering material juxtaposed to said first transparent member and said semitransparent member.

10. A passenger-cabin lighting device, comprising:
   a transparent member including a main body made of synthetic resin not containing scattering material, said transparent member having an exterior surface and an interior surface;

a semitransparent member including a second main body made of semitransparent synthetic resin containing the scattering material, said semitransparent member being bonded to the interior surface of said transparent member, thereby forming a diffusing layer between said interior surface and said semitransparent member;

a plurality of light emitting diodes arranged to project light into said transparent member and said semitransparent member, said light emitting diodes disposed adjacent said transparent member and said semitransparent member; and a control circuit connected to said plurality of light emitting diodes adapted to control flickering of said light emitting diodes.

11. A passenger-cabin lighting device according to claim 10, wherein said light emitting diodes are adapted to emit light of two or more colors.

12. A passenger-cabin lighting device according to claim 11, wherein said light emitting diodes are adapted to emit red, green, and blue light.

13. A passenger-cabin lighting device according to claim 10, wherein said control circuit is adapted to selectively control one of a spot lighting and an illumination control.

14. A passenger-cabin lighting device according to claim 10, wherein said control circuit is adapted to vary colors one to another in a time sequential manner.

15. A passenger-cabin lighting device according to claim 10, wherein said transparent member is cylindrically shaped, forming a bore.

16. A passenger-cabin lighting device according to claim 15, wherein said semitransparent member is cylindrically shaped, and is disposed within said bore.

17. A passenger-cabin lighting device according to claim 10, wherein said light emitting diodes are disposed on an end face of said transparent member and an end face of said semitransparent member, both of said end faces being substantially in one plane.

18. A passenger-cabin lighting device according to claim 10, further comprising a second transparent member including a synthetic resin not containing scattering material juxtaposed to said transparent member and said semitransparent member.

* * * * *